(12) United States Patent
Mathur

(10) Patent No.: US 12,043,803 B2
(45) Date of Patent: Jul. 23, 2024

(54) PROCESS FOR PRODUCING OLEFINS FROM RENEWABLE NAPHTHA

(71) Applicant: Monument Chemical Houston, LLC, Houston, TX (US)

(72) Inventor: Indresh Mathur, Sugar Land, TX (US)

(73) Assignee: Monument Chemical Houston, LLC, Houston, TX (US)

( * ) Notice: Subject to any disclaimer, the term of this patent is extended or adjusted under 35 U.S.C. 154(b) by 20 days.

(21) Appl. No.: 17/347,197

(22) Filed: Jun. 14, 2021

(65) Prior Publication Data

US 2022/0396737 A1   Dec. 15, 2022

(51) Int. Cl.
*C10G 11/04* (2006.01)

(52) U.S. Cl.
CPC ...... *C10G 11/04* (2013.01); *C10G 2300/1014* (2013.01); *C10G 2300/1018* (2013.01); *C10G 2300/202* (2013.01); *C10G 2300/308* (2013.01)

(58) Field of Classification Search
CPC ............ C10G 11/04; C10G 2300/1014; C10G 2300/308; C10G 2300/202; C10G 2300/1018
See application file for complete search history.

(56) References Cited

U.S. PATENT DOCUMENTS

| | | | |
|---|---|---|---|
| 10,479,740 B2 | 11/2019 | Hubertus et al. | |
| 10,919,820 B2 | 2/2021 | Hubertus et al. | |
| 2011/0319683 A1* | 12/2011 | Abhari | C07C 9/14 585/16 |
| 2017/0252731 A1* | 9/2017 | Hodoshima | B01J 35/026 |
| 2020/0087228 A1 | 3/2020 | Fletcher | |

OTHER PUBLICATIONS

Gasolfin, Paraffinic Naphtha Conversion in the Gasolfin Process by Ray Fletcher, dated Jun. 2021, 111 pages.

* cited by examiner

*Primary Examiner* — Thuan D Dang
(74) *Attorney, Agent, or Firm* — Gunther J. Evanina; BUTZEL LONG

(57) ABSTRACT

A process for preparing olefins, especially ethylene, butylene and propylene, includes contacting a renewable naphtha having a hexane and heptane content of from 70% to 80% with a heterogeneous cracking catalyst comprising a matrix component and a molecular sieve having a framework of silica, alumina and a metal selected from Zn, Fe, Ce, La, Y, Ga and/or Zr.

19 Claims, No Drawings

PROCESS FOR PRODUCING OLEFINS FROM RENEWABLE NAPHTHA

FIELD OF THE DISCLOSURE

This disclosure relates to catalytic cracking of renewable naphtha to produce olefins.

BACKGROUND OF THE DISCLOSURE

A growing market for renewable diesel and renewable jet fuel is developing. This growth is attributable to a variety of factors, including federal and state regulations that incentivize and/or mandate reduced greenhouse gas emissions. Additionally, these renewable fuels provide an alternative to geologically derived and depleting fossil fuel sources and will play an important role in meeting the global goal of transitioning to zero-emission transportation.

Renewable diesel and jet fuels are produced by processes that can convert (by hydrodeoxygenation, hydrotreatment and isomerization) a variety bio-renewable feedstocks to fuels. These bio-renewable feedstocks include glycerides (i.e. monoglycerides, diglycerides, triglycerides, etc.) and/or fatty acids from sources such as animal fats, animal oils, poultry fat, poultry oils, vegetable oils, vegetable fats, plant fats and oils, rendered fats, rendered oils, restaurant grease, brown grease, waste industrial frying oils, fish oils, tall oil, and the like in any combination thereof. The products of these processes can be used neat (i.e., at 100% concentration) or in blends with fossil fuels and/or biofuels in generally any proportion that meets current fuel specifications.

Due to the various advantages of renewable diesel and jet fuels, it is likely that the demand for these fuels will continue to grow for many years into the future.

The processes that are used to produce renewable diesel and renewable jet fuels also co-produce renewable naphtha. The renewable naphtha, because it is sulfur free and virtually aromatics free, is quite different from the conventional petroleum naphtha which is considered to be one of the main reasons for air pollution around the globe. The 100% hydrocarbon, plant oils and animal fat derived, renewable naphtha typically comprises about 95% to 99% C5 (pentanes) to C8 (octanes) paraffinic hydrocarbons, with less than 5% of other paraffinic hydrocarbons, and only traces of other compounds. Renewable naphtha has an octane rating (of about 65) that is too low for use as a transportation fuel by itself. However, renewable naphtha can be blended with ethanol or other oxygenates and higher octane rated components to produce renewable gasoline for internal combustion engines. Naphtha (including renewable naphtha) can also be used to produce olefinic compounds (e.g., via steam cracking or catalytic cracking) employed in the production of bioplastics and renewable chemicals, renewable solvents and biocosmetics.

U.S. Patent Application No. 2020/007228 A1 describes an improved catalytic cracking process for achieving high conversion of pentane to propylene using a specified heterogeneous catalyst in one or more fixed bed reactors. Although this document states that the hydrocarbon feed may be any mixture of hydrocarbons comprising pentane, the detailed examples and disclosed preferences are limited to refinery petroleum products derived from geological formations. The disclosure also suggest that the hydrocarbon feed should have a high pentane content, preferably more than 50 wt. % of iso-pentanes and/or normal-pentanes, with any remaining compounds being C4 and C6-hydrocarbons.

SUMMARY OF THE DISCLOSURE

This disclosure relates to the use of an unconventional feedstock in a catalytic cracking process using a previously known heterogeneous cracking catalyst to achieve unexpected and highly advantageous results including economically viable conversion of a co-product of a process for producing renewable diesel fuel and/or renewable jet (aviation) fuel from plant and/or animal fats into valuable renewable olefins (primarily ethylene, propylene and butylene), which are for example useful in the production of bioplastics (e.g., polyolefins) and other renewable chemicals of value.

DETAILED DESCRIPTION

In certain aspects of this disclosure the term "renewable naphtha" is the same as bio-renewable naphtha, bio-naphtha or green-naphtha and refers to an environmentally friendly product obtained from processing of animal and/or vegetable fats and/or oils, or a light hydrocarbon feedstock derived from a non-petroleum source, or a co-product of a process for producing renewable fuels such as renewable diesel and/or renewable aviation fuels. The conventional processes for producing renewable diesel fuels and renewable aviation fuel generally involves obtaining a feedstock comprised of animal and/or vegetable oils and/or fats; removing impurities; subjecting the refined feedstock to a catalytic hydrodeoxygenation process to remove oxygen atoms and create a pure hydrocarbon intermediate; and isomerizing the intermediate product to produce the final renewable fuel product. The renewable naphtha co-products used in the processes disclosed herein are likewise subjected to hydrodeoxygenation and cracking, and optionally isomerization.

In certain other aspects of this disclosure the renewable naphtha suitable for use in the disclosed process can be characterized as having an initial boiling point of from about 30-50° C. and a final boiling point of about 130-140° C., with a typical range being about 40° C. to 200° C. This renewable naphtha typically has a very low sulfur content, such as less than 3 ppm or less than 1 ppm, and a very low nitrogen content, typically less than 1 ppm or less than 0.5 ppm, and no metals or chlorides. The renewable naphtha used in the disclosed process can have a specific gravity (ratio of density relative to that of water at 15.56° C.) of from 0.65 to 0.75, typically about 0.674. Aromatic compounds and olefinic compounds are typically present in only trace amounts (e.g., less than 0.5% or less than 0.01%), and total naphthene compounds are present in an amount of less than 2%. All percentages are by weight unless otherwise indicated. The renewable naphtha feed used in the disclosed process comprises from about 70% to 80% iso- and normal-hexanes (C6) and iso- and normal-heptanes (C7); and from about 95% to 98% pentanes, octanes, hexanes, heptanes and octanes, with other alkanes comprising less than 5%, and preferably less than 3%, of the naphtha feed. The renewable naphtha used in the disclosed process typically does not contain a measurable amount of water (e.g., less than 0.01%). A typical renewable naphtha composition in weight percent is as follows:

| Carbon# | Iso- | Normal- | Total |
|---------|------|---------|-------|
| C4 | <1 | <1 | <1 |
| C5 | 7 | 4 | 11 |
| C6 | 27 | 11 | 38 |
| C7 | 30 | 6 | 36 |
| C8 | 11 | 2 | 13 |
| ≥9 | <1 | <1 | <2 |

The heterogeneous catalyst, applicable to the process disclosed here, comprises a matrix component and a molecular sieve comprising framework alumina, framework silica and a framework metal selected from the group of Zn, Fe, Ce, La, Y, Ga and/or Zr. Fe is preferred and combinations of Fe and Ga are preferably excluded. Suitable matrix materials are aluminum oxide, alumina silicate, silica, aluminum phosphate, silica aluminophosphate or a combination thereof. Silica and silica phosphate are preferred, silica most preferred. To the catalyst a clay can be added. The catalyst may comprise between 1 and 50 wt. % of such a clay. Examples of suitable clays are montmorillonite, hectorite, beidellite, nontronite, saponite and laponite, a synthetic hectorite, or clays to improve physical properties, such as more elongated shaped clays.

Preferably the framework metal is selected from the group of Zn, Ga or Fe and more preferably Ga and/or Fe and most preferably Fe. The molecular sieve may further comprise extra framework iron compounds. The initial framework metal may be extracted from the framework during use and become an extra framework metal compound. The atomic ratio between framework Al and framework metal is preferably between 1:0.05 and 1:0.5. Preferably this ratio is below 0.4, more preferably below 0.2. Especially good results with respect to a low coke yield have been achieved at a ratio of between 0.05 and 0.1.

It is believed that by preparing the catalyst such that a metal as described above is present next to aluminum as part of the framework of the molecular sieve a pore structure is obtained which is beneficial for achieving a high yield in olefins (e.g., ethylene, propylene and butylene) and a good alkane conversion. As explained above, part of the framework metal may become extracted from the framework. It is even believed that all framework metal may be extracted from the framework while the catalyst is still functioning as desired. The process to prepare ethylene, propylene and butylene from a renewable naphtha can include contacting the renewable naphtha with a heterogeneous cracking catalyst present in one or more fixed beds to obtain a cracked effluent that is rich in olefin products. In a preferred process, the heterogeneous catalyst comprises a matrix component and a modified molecular sieve comprising framework alumina and framework silica and wherein the catalyst is obtainable by (i) crystallization of a synthesis gel comprising $FeCl_3$ to obtain a molecular sieve product comprising a framework Al, Si and Fe, (ii) calcining, (iii) mixing with the matrix and (iv) calcined until the molecular sieve has a framework Fe to framework Al molar ratio of less than 0.05.

The crystallization of a synthesis gel comprising $FeCl_3$ of step (i) may be performed as described by B. R. Wood et al. Journal of Catalysis 225 (2004) 300-306. The obtained crystals are calcined, after washing with a solution able to remove the Na from the zeolite, preferable an ammonium salt solution, preferably at a temperature of between 150 and 600° C., for at least 1 hour. In step (iii), the calcined crystals are mixed with a suitable matrix compound and the resulting sample is calcined in step (iv), preferably at a temperature between 350 and 700° C. for at least 0.5 hours such that the framework Fe to framework Al molar ratio is less than 0.05 and may even become zero. Such a catalyst may also be obtained by starting the cracking process using a catalyst having a framework Fe to framework Al molar ratio of more than 0.05. In the activation and regeneration cycles of the process it is found that Fe will leave the framework and a catalyst will be obtained having the desired framework Fe to framework Al molar ratio of less than 0.05.

The catalyst may comprise phosphorus to improve its stability. Phosphorus can be introduced to obtain a heterogeneous catalyst comprising between 0.5 and 10 wt. % $P_2O_5$. Such impregnation can be performed prior to the mixing or shaping step (iii), during step (iii) or after performing step (iii). Optionally, the impregnation step may be performed after calcination step (iv). If such phosphorus impregnation step is performed after step (iv) a final calcination after such impregnation is preferred. Preferably the heterogeneous catalyst comprises between 0.5 and 10 wt. % $P_2O_5$. More preferred between 1 and 5 wt. % $P_2O_5$.

The invention is also directed to a process to prepare olefins from a renewable naphtha feed comprising 70% to 80% hexanes and heptanes by contacting the feed with a heterogeneous cracking catalyst in one or more fixed (packed) bed reactors.

The content of the modified molecular sieve in the heterogeneous catalyst is preferably between 10 and 75 wt. %. Though applications can be envisioned where the catalyst solely consists of zeolite, such as a membrane grown out of zeolites.

The molecular sieve may be a modified MFI, FER or MOR type or combinations thereof. The modification is that part of the framework alumina of the MFI, FER or MOR type molecular sieve is substituted by the framework metal. Preferably the molecular sieve is of the MFI type. A well-known example of a MFI type molecular sieve is ZSM-5.

The silica to alumina atomic ratio (SAR) of the molecular sieve is suitably between 20 and 300. If the SAR of the molecular sieve is too low, well known dealumination steps may be performed to dealuminate the molecular sieve. Examples of dealumination steps are steaming and leaching.

The molecular sieve is present in the heterogeneous catalyst as crystals having a size smaller than 100 nm, more preferentially smaller than 70 nm and most preferred smaller than 50 nm as measured by XRD.

The heterogeneous catalyst may be prepared by the process described above or by any other process. For example, when another metal than Fe is used comparable catalyst preparation methods may be used known to the skilled person.

The process is performed by contacting a hydrocarbon feed comprising from about 70% to 80% iso- and normal-hexanes (C6) and iso- and normal-heptanes; and from about 95% to 98% pentanes, octanes, hexanes, heptanes and octanes, with a heterogeneous cracking catalyst as present in one or more fixed beds. The temperature in the one or more fixed beds is suitably between 300 and 750° C., more preferred between 300 and 700° C. and most preferred between 450 and 600° C. The absolute pressure is suitably between 0.05 and 10 MPa and preferably between 0.1 and 0.5 MPa. It is preferred to reduce residence time, suppress coke make and reduce hydrocarbon partial pressure via dilution of steam. The reduction in hydrocarbon partial pressure boosts the dehydrogenation reaction, suppresses the reverse reaction, and suppresses the recombination of light olefins.

The weight hourly space velocity, WHSV, as expressed in mass flow (per hour) divided by the mass of the catalyst is preferably higher than 20/hour and more preferably higher than and including 50/hour. A WHSV above 100/hour is most preferred.

The process can be carried out in one or more packed bed reactors. More than one bed refers to packed beds arranged in series. A similar second or even a third set of packed bed or beds may be arranged parallel to a first bed or beds. These second or third bed or beds may be used for performing the process according to the invention when the first bed or beds are regenerated to remove coke and optionally other contaminants. An example of such a regeneration process is when the reactors are operated as a simulated moving bed. It is also conceivable that not all packed beds in one set of beds in series are regenerated at a time. Instead, a packed bed in a set of packed beds may have a longer run time as a result of the different catalyst composition with the packed bed and thus require less frequent regeneration than the remaining beds in the same in-series configuration.

If more than one packed bed in series is used to perform the process it may be advantageous to remove some of the low boiling reaction products including ethylene, propylene and butylene from the reaction mixture in between the packed beds. This may be performed by means of a flash separation. The low boiling gasses thus obtained may be provided to a separation unit in which ethylene, propylene and butylene are isolated from the reaction products of the most down-stream packed bed as will be described in more detail below. The higher boiling fraction as obtained in such a separation may be provided to the next bed or even internally recirculated to one or more of the up-stream beds, optionally after reheating this fraction. The chosen recycle rate will depend on the olefin content in such a higher boiling fraction and the catalyst gradient in the packed beds. Such a direct recycle may also be performed with the higher boiling fraction as obtained when low boiling gasses are separated from the final effluent of the one or more packed beds.

The ethylene, propylene and butylene can be isolated from the cracked effluent. Other compounds can also be isolated from the cracked effluent. Separations may include distillation and/or flash separation.

Any low boiling fractions separated from intermediate streams between the packed beds as described above may be fed to the above described isolation step. Such a fraction may contain some high boiling compounds because of the coarse separation between said beds. By feeding this fraction to this isolation step these high boiling compounds are recovered to be combined with the higher boiling fraction.

A higher boiling fraction obtained after isolation of ethylene, butylene and/or propylene from the cracked effluent can be recycled to the one or more fixed beds or optionally subjected to isomerization.

An isomerization step may be performed by known isomerization processes which are preferably performed in the presence of hydrogen and a chloride platinum alumina catalyst or a platinum-zeolitic catalyst as described below. Hydrogen and high boiling fraction can be contacted in a reaction zone with an isomerization catalyst. The isomerization catalyst used in the isomerization zone can include traditional isomerization catalysts. A preferred isomerization catalyst is a chloride platinum alumina catalyst such as described in U.S. Pat. No. 5,245,102. The aluminum is preferably an anhydrous gamma-alumina with a high degree of purity. The catalyst may also contain other platinum group metals. The term platinum group metals refer to noble metals excluding silver and gold which are selected from the group consisting of platinum, palladium, germanium, ruthenium, rhodium, osmium, and iridium. These metals demonstrate differences in activity and selectivity such that platinum has now been found to be the most suitable for this process. The catalyst will contain from about 0.1 to 0.25 weight percent of the platinum. Other platinum group metals may be present in a concentration of from 0.1 to 0.25 weight percent. The platinum component may exist within the final catalytic composite as an oxide or halide or as an elemental metal. The presence of the platinum component in its reduced state has been found most suitable for this process. The chloride component termed in the art "a combined chloride" is present in an amount from about 2 to about 10 weight percent based upon the dry support material. The use of chloride in amounts greater than 5 weight percent have been found to be the most beneficial for this process. The inorganic oxide preferably comprises alumina and more preferably gamma-alumina, eta-alumina, and mixtures thereof.

Another isomerization catalyst composition comprises a Group VIII noble metal, a hydrogen form crystalline aluminosilicate and a refractory inorganic oxide as for example described in U.S. Pat. No. 5,245,102. The catalyst composition suitably has a surface area of at least 580 m$^2$/g and preferably above 580 m$^2$/g. A preferred Group VIII noble metal is platinum. The Group VIII noble metal is present in an amount from about 0.01 to 5 percent by weight of the composite and preferably in an amount of at least 0.15 percent by weight but not over 0.35 percent by weight. The zeolitic catalytic composite may also contain a catalytically effective amount of a promoter metal such as tin, lead, germanium, cobalt, nickel, iron, tungsten, chromium, molybdenum, bismuth, indium, gallium, cadmium, zinc, uranium, copper, silver, gold, tantalum, or one or more of rare earth metals and mixtures thereof. The hydrogen formed silica alumina has either a three-dimensional or channel pore structure crystal lattice framework. The three-dimensional aluminosilicates include both synthetic and naturally occurring silica aluminas such as faujasites, which include X-type, Y-type, ultrastable-Y, and the like. L-type, omega-type, and mordenite are examples of the channel pore structure crystalline aluminosilicates. Mordenite, in either naturally occurring or synthetic form and WI-type zeolites, like ZSM-5, are preferred.

The above isomerization catalysts may be sensitive to sulfur and oxygen-containing compounds. An advantage of the disclosed process using renewable naphtha is that they are relatively free of such compounds.

Hydrogen can be admixed with the high boiling compounds in an amount that will provide a hydrogen to hydrocarbon molar ratio of from 0.01 to 10 in the effluent from the isomerization zone. Preferably, the hydrogen to hydrocarbon ratio is in the range of 0.05 to S. Although no net hydrogen is consumed in the isomerization reaction, the isomerization zone will have a net consumption of hydrogen often referred to as the stoichiometric hydrogen requirement which is associated with a number of side reactions that occur. These side reactions include saturation of olefins and aromatics, cracking and disproportionation. For high boiling compound mixtures having a high level of unsaturates, satisfying the stoichiometric hydrogen will require a higher hydrogen to hydrocarbon ratio for the feed at the inlet of the isomerization zone. Optionally, a hydrogenation step upstream of the isomerization step may be performed to saturate these unsaturated compounds. Hydrogen in excess of the stoichiometric amounts for the side reactions is often maintained in the reaction zone to provide stability and conversion by compensating for variation in feedstream compositions that alter the stoichiometric hydrogen requirements.

Operating conditions within the isomerization zone are selected to maximize the production of isoalkane product from the feed components. Temperatures within the reaction zone will usually range from 40 to 320° C. and preferably 60 to 160° C. Pressure conditions in the isomerization of C4-C6 paraffins range from 0.7-7 MPa and preferably 2-3 MPa. The feed rate to the reaction zone can also vary over a wide range. These conditions include liquid hourly space velocities ranging from 0.5 to 12 hr-1, however, space velocities between 1 and 6 hr-1 are preferred. The isomerization zone will usually operate at a LHSV of about 1.5.

From the effluent of the isomerization step hydrogen, butane and lighter gaseous compounds may be separated in one or more steps before recycling this effluent to the cracking reactor.

The higher boiling fraction or part of it may also be used as part of a renewable gasoline motor fuel or as feedstock for renewable solvents. Part of the higher boiling fraction can be removed rather than recycled to avoid the build-up of compounds which are difficult to convert in the cracking process.

The renewable naphtha feed is essentially devoid aromatic compounds (e.g., typically less than 0.1%).

When the process involves the here described recycle of higher boiling compounds it may be desirable to extract aromatics from the recycle stream before combining it with renewable naphtha. Although the renewable naphtha feed does not contain high amounts of aromatics these compounds may be formed in the cracking process.

The high boiling fraction which is recycled to the one or more fixed beds of the cracking step may be partly or in whole be subjected to aromatics extraction if the content of aromatics in the high boiling fraction is high.

A suitable commercially available aromatics extraction process is the GT-BTX PluS type as developed and offered by GTC Technology, Houston TX.

The heterogeneous cracking catalyst may comprise an acidic material. Suitable acidic materials may be a molecular sieve or a material having strong acid sites. A first type of heterogeneous cracking catalyst does not comprise a molecular sieve and does comprise a material having strong acid sites as the acidic material. A suitable acidic material is an amorphous or semi-crystalline material chosen from the group of heteropoly acids, alumina, boehmite alumina, gamma alumina, theta alumina, silica alumina, silica-titania, silica-tungsten, silica phosphorous, silica-alumina-phosphorous. The acidic material may also be a molecular sieve. An advantage of a molecular sieve is the high acid site density per reactor volume.

If a molecular sieve is used it is preferred that an optional carrier as part of the catalyst particles may have no strong acid sites, some strong acid sites or only strong acids sites. The choice of suitable optional carrier will depend on the composition of the feedstock. Preferably the carrier does not have strong acid sites. The molecular sieve may have 8-membered oxygen ring channels such as Chabazite, also referred to as CHA structure type according to the Atlas of zeolite structure types, 4th rev. ed/W. M. Meier, D. H. Olson and Ch. Baerlocher. A typical example of such a molecular sieve is SAPO-34. The molecular sieve is suitably an intermediate pore-size zeolite. The term "intermediate pore-size zeolite" is meant to indicate any zeolite of which the pore size is intermediate between the pore size of a small pore-size zeolite such as typically A-type zeolite, and the pore size of a large pore-size zeolite such as typically mordenite, or X-type or Y-type zeolite." The intermediate pore size zeolite has a 10 or 12-membered oxygen ring in the crystal structure thereof. The zeolite suitably has a silica to alumina ratio between 10-300 and more preferred between 10-50. Examples of the intermediate pore-size zeolite are ZSM-5, ZSM-8, ZSM-11, ZSM-12, ZSM-21, ZSM-23, ZSM-35, ZSM-38. Preferably the molecular sieve is chosen from the structure types having a 10-ring channels according to structure types MFI, MEL, IMF, TUN and EUO. MFI is also known as ZSM-5, MEL is known as ZSM-11, IMF is known as IM-5 and TUN is known as TNU-9. Of this list MFI is most preferred in view of its availability combined with its performance.

The above molecular sieves may be present as such to provide the cracking catalyst. Suitably, the molecular sieve is comprised in a carrier, wherein the weight content of the molecular sieve in the heterogeneous catalyst is between 5 and 70 wt. %. The carrier may be silica, silica alumina or alumina and may be suitably treated with phosphorous as described for the innovative catalyst.

Conventional processes using a petroleum derived feed are prone to catalyst coking and fouling and typically require energy to burn off carbon deposits. This routine catalyst regeneration, approximately one to three days, is costly and results in huge carbon dioxide emissions to the environment. The coking is in large part attributable to the presence of substantial amounts of aromatic compounds and other unsaturated hydrocarbon compounds in the petroleum naphtha feed of conventional cracking process. In contrast, the disclosed process using a renewable naphtha (derived from biological sources as opposed to petroleum sources) contain a very low content of aromatic compounds and other unsaturated compounds, essentially eliminating or substantially reducing coking, such that catalyst regeneration is required much less frequently (e.g., possibly on a weekly, bi-weekly, monthly or quarterly basis). This also results in reduced carbon dioxide emissions and less energy consumption to regenerate the catalyst compared to the conventional process.

The described embodiments are preferred and/or illustrated, but are not limiting. Various modifications are considered within the purview and scope of the appended claims.

The invention claimed is:

1. A process for producing olefins, comprising: cracking a renewable naphtha by contacting the renewable naphtha with a heterogeneous cracking catalyst comprising a matrix component and a molecular sieve having a framework of silica, alumina and a metal selected from Zn, Fe, Ce, La, Y, Ga and Zr, to produce the olefins.

2. The process of claim 1, wherein the renewable naphtha comprises from 70% to 80% hexanes and heptanes by weight.

3. The process of claim 1, wherein the renewable naphtha has a specific gravity of from 0.65 to 0.75.

4. The process of claim 1, wherein the renewable naphtha comprises 95 weight percent to 98 weight percent alkanes having 5 to 8 carbon atoms.

5. The process of claim 1, wherein the renewable naphtha comprises less than 0.5% aromatics.

6. The process of claim 1, wherein the renewable naphtha comprises less than 2% naphthene compounds by weight.

7. The process of claim 1, wherein the renewable naphtha comprises less than 3 ppm sulfur by weight.

8. The process of claim 1, wherein the renewable naphtha comprises less than 1 ppm nitrogen by weight.

9. The process of claim 1, wherein the renewable naphtha comprises less than 0.01% water by weight.

10. A process for producing olefins, comprising:
cracking a hydrocarbon composition derived from biological sources by contacting the hydrocarbon composition with a heterogeneous cracking catalyst comprising a matrix component and a molecular sieve having a framework of silica, alumina and a metal selected from Zn, Fe, Ce, La, Y, Ga and Zr to produce the olefins.

11. The process of claim 10, wherein the biological sources comprise animal and/or vegetable fats and or oils.

12. The process of claim 10, wherein the hydrocarbon composition comprises from 70% to 80% hexanes and heptanes by weight.

13. The process of claim 10, wherein the hydrocarbon composition has a specific gravity of from 0.65 to 0.75.

14. The process of claim 10, wherein the hydrocarbon composition comprises 95 weight percent to 98 weight percent alkanes having 5 to 8 carbon atoms.

15. The process of claim 10, wherein the hydrocarbon composition comprises less than 0.5% aromatics.

16. The process of claim 10, wherein the hydrocarbon composition comprises less than 2 ppm naphthene compounds by weight.

17. The process of claim 10, wherein the hydrocarbon composition comprises less than 3 ppm sulfur by weight.

18. The process of claim 10, wherein the hydrocarbon composition comprises less than 1 ppm nitrogen by weight.

19. The process of claim 10, wherein the hydrocarbon composition comprises less than 0.01% water by weight.

* * * * *